(12) United States Patent
Kaliboukis et al.

(10) Patent No.: US 9,747,637 B1
(45) Date of Patent: Aug. 29, 2017

(54) MULTI-SENSORY BASED NOTIFICATIONS FOR FINANCIAL PLANNING

(71) Applicant: Wells Fargo Bank, N.A., San Francisco, CA (US)

(72) Inventors: Chris Kalaboukis, San Jose, CA (US); Ramanathan Ramanathan, Bellevue, WA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 15/194,099

(22) Filed: Jun. 27, 2016

(51) Int. Cl.
  *G06Q 40/00* (2012.01)
  *H04W 4/02* (2009.01)
  *G08B 21/18* (2006.01)

(52) U.S. Cl.
  CPC ............. *G06Q 40/00* (2013.01); *G08B 21/18* (2013.01); *H04W 4/02* (2013.01)

(58) Field of Classification Search
  CPC .................................. G08B 21/18; H04W 4/02
  USPC .................... 340/286.01, 286.02, 309.2, 326
  See application file for complete search history.

(56) References Cited

U.S. PATENT DOCUMENTS

| | | | |
|---|---|---|---|
| 7,813,989 B2 | 10/2010 | Jones et al. | |
| 7,895,102 B1 | 2/2011 | Wilks et al. | |
| 8,050,545 B2 * | 11/2011 | Manne | A61L 9/035 392/390 |
| 8,155,706 B1 * | 4/2012 | Hurst | H04M 19/04 222/325 |
| 8,635,101 B2 | 1/2014 | Wright | |
| 8,747,735 B2 | 6/2014 | Homer | |
| 8,768,782 B1 | 7/2014 | Myslinski | |
| 8,897,629 B1 | 11/2014 | Deacon | |
| 8,972,559 B2 | 3/2015 | Sutcliffe | |
| 2004/0050948 A1 | 3/2004 | Bartels | |
| 2004/0235430 A1 * | 11/2004 | Ma | A61L 9/03 455/90.1 |
| 2006/0020533 A1 | 1/2006 | Lee | |

(Continued)

FOREIGN PATENT DOCUMENTS

WO 00/78367 A1 12/2000

OTHER PUBLICATIONS

Wynick, Alex, "iSmell: Smartphones can now emit SMELLS with new app," http://www.mirror.co.uk/news/technology-science/technology/scentee-smartphones-can-now-emit-2651766, Oct. 29, 2013, 5 pages.

(Continued)

*Primary Examiner* — Tai T Nguyen
(74) *Attorney, Agent, or Firm* — Merchant & Gould P.C.

(57) ABSTRACT

Generating a sensory notification for a user of an electronic computing device includes receiving an indication at the electronic computing device that a trigger for an alert has occurred. The trigger is related to an occurrence of a trigger condition. The sensory notification associated with the trigger condition is identified. A determination is made as to whether the user is near the electronic computing device. When the indication is received that the trigger for the alert has occurred and when a determination is made that the user is near the electronic computing device, a scent corresponding to the sensory notification is caused to emanate from the electronic computing device.

19 Claims, 7 Drawing Sheets

(56) References Cited

U.S. PATENT DOCUMENTS

| | | | |
|---|---|---|---|
| 2006/0293871 A1* | 12/2006 | Fazzio | A61L 9/035 703/5 |
| 2007/0100986 A1 | 5/2007 | Bagley et al. | |
| 2008/0070567 A1* | 3/2008 | Sadler | A61L 9/02 455/425 |
| 2013/0030994 A1 | 1/2013 | Calman et al. | |
| 2014/0310136 A1 | 10/2014 | Cvetkovski | |
| 2015/0213472 A1 | 7/2015 | Raikula | |
| 2016/0027102 A1 | 1/2016 | Smith et al. | |

OTHER PUBLICATIONS

Strauss, Paul, "ScentScape Programmable Aroma Generator: Boy, Does Your Computer Smell," http://technabob.com/blog/2011/01/10/scentscape-programmable-aroma-generator/, Jan. 10, 2011, 3 pages.

Quick, Darren, "Chat Pert attachment turns an iPhone into a smell-o-phone," Mobile Technology, http://www.gizmag.com/chat-pert-smell-o-phone/27541/, May 16, 2013, 5 pages.

Scent Machines & Fragrance Delivery Systems for Businesses, http://www.scentair.com/why-scentair/solutions/index.html, Apr. 18, 2016, 3 pages.

Harris, Jenn, "Scentee makes your phone smell like a cinnamon roll or Korean BBW when you get a text," http://www.latimes.com/food/dailydish/la-dd-smartphone-smell-bacon-scentee-20131030 . . . , Oct. 31, 2013, 2 pages.

Scentee—Enjoy scent on your smartphone, http://scentee.com/, Copyright 2013 Scentee, 2 pages.

\* cited by examiner

MULTI-SENSORY BASED NOTIFICATIONS FOR FINANCIAL PLANNING

BACKGROUND

Customers of organizations such as financial institutions can establish goals with the organizations and have the organizations monitor progress towards the goals. Example goals can be saving for a vacation or for college and establishing and maintaining a budget. The organizations can monitor customer activity and periodically provide feedback to the customer regarding progress towards the goals.

When a customer is not making progress towards one or more goals, an organization may be motivated to communicate more frequently with the customer in an attempt to notify the customer that progress towards the goal is not being made. However, some forms of communication, such as email messages and text messages, may be ignored by the customer. In addition, physically challenged customers, such as those who are hearing or visually impaired, may not respond well to communications such as email messages, text messages and telephone calls.

SUMMARY

Embodiments of the disclosure are directed to a method implemented on an electronic computing device for generating a sensory notification for a user of the electronic computing device, the method comprising: receiving at the electronic computing device an indication that a trigger for an alert has occurred, the trigger related to an occurrence of a trigger condition; identifying the sensory notification associated with the trigger condition; determining whether the user is near the electronic computing device; and when the indication is received that the trigger for the alert has occurred and when a determination is made that the user is near the electronic computing device, causing a scent corresponding to the sensory notification to emanate from the electronic computing device.

In another aspect, an electronic computing device capable of producing a scent, the electronic computing device comprises: a processing unit; system memory; and a scent producing component, wherein the system memory of the electronic computing device includes instructions that cause the processing unit to initiate production of a specific scent, using the scent producing component, when an indication that a trigger condition has occurred is received at the electronic computing device, the specific scent that is produced corresponding to the trigger condition.

In yet another aspect, a computer-readable data storage memory comprising instructions that, when executed by a processing unit of an electronic computing device, cause the processing unit to: receive at the electronic computing device a first indication that a first trigger for a first alert has occurred, the first trigger related to an occurrence of a first trigger condition, the first trigger condition related to a financial health of a user; identify a first scent that is mapped to the occurrence of the first trigger condition, the first scent being one of a plurality of scents available on the electronic computing device, each of the one of the plurality of scents being mapped to one of a plurality of trigger conditions; determine whether motion and light can be detected near the electronic computing device; when the first indication is received that the first trigger for the first alert has occurred and when a determination is made that motion and light are detected near the electronic computing device, activate the first scent on the electronic computing device, the activating of the first scent causing the first scent to emanate from the electronic computing device; receive on the electronic computing device a second indication that a second trigger for a second alert has occurred, the second trigger related to an occurrence of a second trigger condition, the second trigger condition being different than the first trigger condition, the second trigger being mapped to a second scent that is different than the first scent, the second scent being one of the plurality of scents available on the electronic computing device; determine whether motion and light can be detected near the electronic computing device; and when the second indication is received that the second trigger for the second alert has occurred and when a determination is made that motion and light are detected near the electronic computing device, activate the second scent on the electronic computing device, the activating of the second scent causing the second scent to emanate from the electronic computing device.

The details of one or more techniques are set forth in the accompanying drawings and the description below. Other features, objects, and advantages of these techniques will be apparent from the description, drawings, and claims.

DETAILED DESCRIPTION

Figure 1:
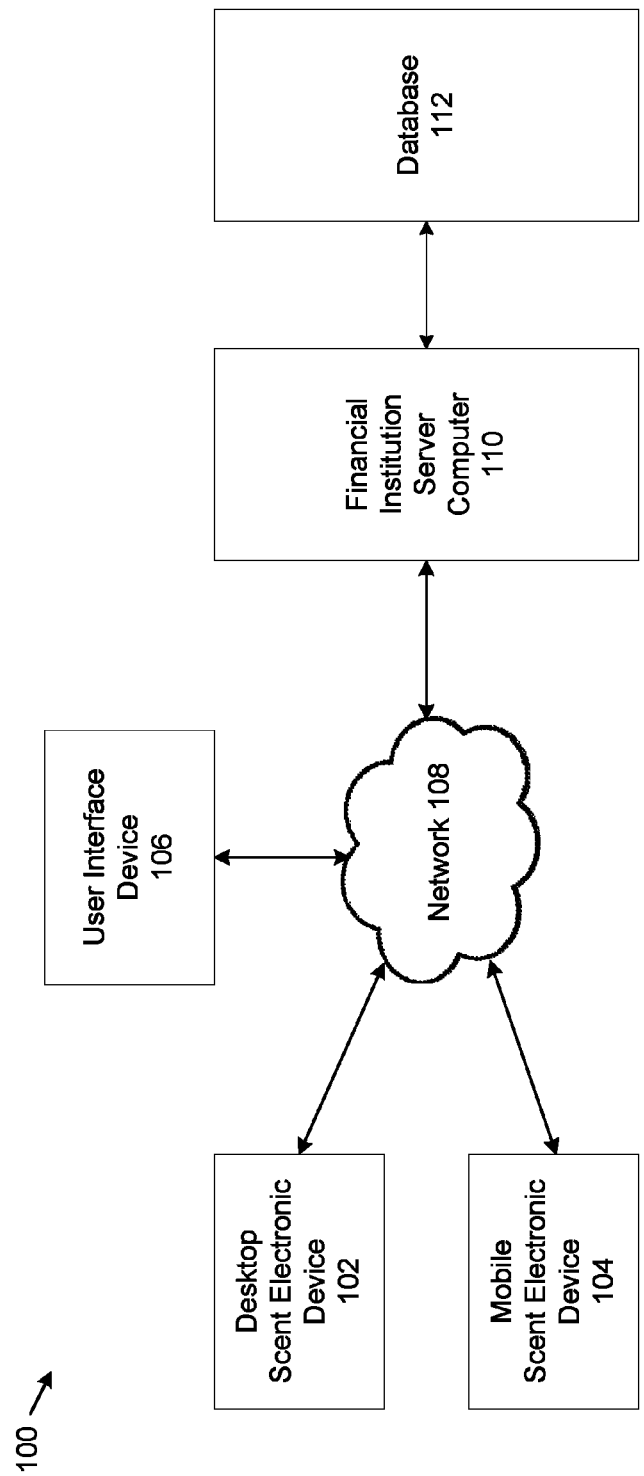
FIG. 1 shows an example system that supports a multi-sensory based financial planning and notification system and device.

The present disclosure is directed to systems and methods that can provide multi-sensory notifications to customers of an organization. The multi-sensory notifications can include one or more of scent-based notifications, audible notifications, visual notifications and vibratory notifications. The multi-sensory notifications can be provided to the customers from an electronic computing device that can include multi-sensory notification capability. The notifications can be triggered from alerts sent from a server computer or via events detected directly on the electronic computing device.

The alerts that trigger the notifications can be generated based on a plurality of conditions. For example, the triggers can be based on financial conditions, time-based conditions, space-based conditions, communications-based conditions, fitness-based conditions, conditions based on fraudulent activity and identity theft and conditions based on an interconnection with other devices. Example financial conditions can correspond to a financial health of the user and can include bill payment alerts, stock price/stock trade triggers and progress towards financial goals. Example time-based conditions can include calendar items, timers and alarms. Example communications-based conditions can include emails, texts and social media updates. Example fitness-based conditions can include steps taken, miles walked, etc. More, fewer or different trigger conditions can be used. Other examples of financial conditions, time-based conditions, communications-based conditions and fitness-based conditions are possible.

The electronics computing device that can provide the multi-sensory notifications can be a desktop device or a mobile device. As discussed in more detail later herein, the desktop device can include a cartridge or other means that can be used to dispense scents. The desktop device can also include an audio component and a visual display. The mobile device can include an external assembly or housing that can dispense one or more scents.

The multi-sensory notifications can be localized based on a geographical location of the customer, as determined by a global positioning system (GPS) location of the customer. For example, a smartphone with scent-based notification functionality can provide a specific scent when the customer reaches a specified location. The smartphone can also determine how much scent to dispense based on the specified location. For example, less scent may be used in a retail store than at home to lessen the chance that other people in the retail store may smell the scent. In addition, a mobile device such as a smartphone can include a headset that can direct a scent directly to the customer's nose. This can be useful when providing a scent-based notification in a crowded environment.

The multi-sensory notifications can also be useful to disabled individuals, particularly those who may be hearing or visually impaired. Instead of having to strain to hear or see an alert, the hearing or visually impaired person can make use of his/her sense of smell to be alerted to a specific condition.

In this disclosure, the systems and methods are discussed from the standpoint of a financial organization, such as a bank. The financial institution can provide back-end, cloud based monitoring and analysis of the customer's finances. For example, the financial organization can learn of financial goals for the customer, such as saving for college or a vacation or cutting expenses. The financial organization can monitor financial data for the customer received at the financial institution and determine whether the customer is on track to meeting his/her goals. In some cases, where the customer has one or more credit cards issued by the financial organization, the financial organization can monitor purchases made by the customer as they occur. In other cases, the financial institution can monitor data of customer financial transactions received from other financial institutions. The back-end, cloud based monitoring can also comprise interconnecting with the other financial systems and mining customer financial data at the other financial institutions and connecting with application programming interfaces (APIs) and mining the APIs for data. Other monitoring and analysis by the financial institution is possible.

The systems and methods also provide for a web-based user interface in which a user can capture banking credentials and social media credentials and on which a user can set financial goals and map specific scents to specific goals and outcomes. The web-based interface can be part of a financial application on a user device, such as a smartphone, desktop computer, laptop computer, tablet computer or similar device. In this disclosure, the terms customer and user are used interchangeably.

The systems and methods disclosed herein are directed to a computer technology that can provide a multi-sensory notification system to alert users to specific conditions. In particular, the use of scents that are mapped to specific goals and outcomes can be particularly effective in capturing the attention of the user. Users may ignore traditional notifications such as emails, text messages or web-based notifications. However, users are less likely to ignore a scent based notification, particularly when the user has mapped a particular scent to a specific condition and the user is aware of this mapping. As a result, the financial institutions may be able to send fewer emails and text messages to the user. This can improve efficiencies of financial institution computer systems because fewer emails, texts and other reminders may be necessary.

FIG. 1 shows an example system 100 that supports a multi-sensory based financial planning and notification system and device. The system 100 includes a desktop scent electronic device 102, a mobile scent electronic device 104, a user interface device 106, a network 108, a financial institution server computer 110 and a database 112. More, fewer or different components can be used.

The example desktop scent electronic device 102 is an electronic computing device that includes a component for producing scents based on a specific trigger conditions. As discussed in more detail later herein, the scents can be produced using one of several methods including an aerosol cartridge, a sponge which has been saturated with liquid scent, and heat applied to a solid block of scent. Other methods of producing scent are possible. The desktop scent electronic device 102 is designed to be mounted on a flat surface such as a desktop, a counter top, a piece of furniture or other flat surface.

The example mobile scent electronic device 104 is a mobile electronic device, such as a smartphone, that includes an external assembly or housing for producing scent. Typically, the external assembly includes one or more aerosol cartridges which can produce specific scents.

The example user interface device 106 can be one or more of a desktop computer, a laptop computer, a smartphone, a tablet computer or other user device. The user can access a financial application on the user interface device 106 to connect to the financial institution server computer 110 over network 108. The user can enter financial information and goal information using the financial application. In addition, the user can select specific scents and other sensory notifications, such as audible, visual and vibratory, and map the specific scents and the other sensory notifications to trigger conditions associated with the goal information, as discussed in more detail later herein. In some implementations, the mobile scent electronic device 104 can also be used as the user interface device 106.

The example network 108 is a computer network, such as the Internet, that can permit communication between desktop scent electronic device 102, mobile scent electronic device 104 and financial institution server computer 110. For mobile scent electronic device 104, the communication is via wireless connectivity.

The example financial institution server computer 110 is a server computer at a financial institution, such as a bank. The financial institution server computer 110 can store or have access to financial account records and a personal profile of the user. The personal profile can include personal goals for the user, such as saving for a vacation or college, for maintaining a budget, for cutting specific expenses, and other goals. When the user has a payment card, such as a debit or credit card from the financial institution, the financial institution server computer 110 can also receive records for transactions made with the payment card. When the financial institution server computer 110 does not store the financial account records and the personal profile of the user, the financial institution server computer 110 can access the financial account records and the personal profile from a database, such as database 112, or from another server computer accessible from financial institution server computer 110.

The financial institution server computer 110 can monitor personal goals established by the user and activate an appropriate scent based on a status of the personal goals. The user can access a website of the financial institution server computer 110 to establish the personal goals.

The user can also establish trigger conditions for generating an alert based on a status of progress towards completion of the personal goals. For example, trigger conditions can be established when the user saves an amount of money equal to a certain percentage of completion towards a personal goal within a specific time frame. For example, trigger conditions can be established when the user saves 25%, 50%, 75% and 100% of a goal of saving for a vacation within a time allotted for saving. For example, the user may determine that 25% of the goal needs to be saved at each by each of three month intervals in order to have 100% saved for the vacation within one year. Trigger conditions can also be set for when a user stays within a budget or makes purchases that exceed the budget. Other trigger conditions are possible.

The user can also choose specific scents to be produced when specific goals are met or not met. For example, the user can choose to have a pleasant scent, such as a scent of roses, when 100% of goal is reached and a negative scent, such as onions, when a budget goal is exceeded. The user can also choose an intensity of a scent. For example, a moderate amount of the scent of roses can be produced when 50% of a goal is achieved and a greater amount of the scent of roses can be produced when 100% of the goal is achieved. In addition, a strong negative scent can be activated when a negative financial condition, such as fraudulent activity or identity theft is detected.

When the financial institution server computer 110 determines that a trigger condition has been met, the financial institution server computer 110 can send a message to either desktop scent electronic device 102 or mobile scent electronic device 104 to activate an appropriate sent. The message comprises an alert that the trigger condition has been reached. The desktop scent electronic device 102 or the mobile scent electronic device 104 can then produce the scent, as discussed in more detail later herein.

In some implementations, the financial institution server computer 110 can setup model goals for the user based on typical goals for other users having a similar demographic. The goals can be overall goals, goals for specific types of spending on a per period basis or goals regarding saving towards future goals, such as a vacation.

To conserve scent, the desktop scent electronic device 102 can include one or more sensors to increase a probably that the user is near the desktop scent electronic device 102 before a scent is produced. The sensors can include one or more of a motion detector, a light detector and a heat detector. When a trigger condition occurs, the desktop scent electronic device 102 can monitor the one or more sensors to determine whether it makes sense to release scent at a time of the trigger condition. For example, if a determination is made that the user is not home or is in bed (because it is nighttime), the desktop scent electronic device 102 can delay dispensing scent corresponding to the trigger condition until such time that the user is active in the home.

The desktop scent electronic device 102 and the mobile scent electronic device 104 can also include a low scent detector to detect when scent in a cartridge is below a predetermined amount. The desktop scent electronic device 102 can activate an alert when a low scent condition is detected. The alert can be a visual alert, such as a notification on a display screen of the desktop scent electronic device 102, an audible alert or a vibratory alert, such as a vibration of the desktop scent electronic device 102.

Figure 2:
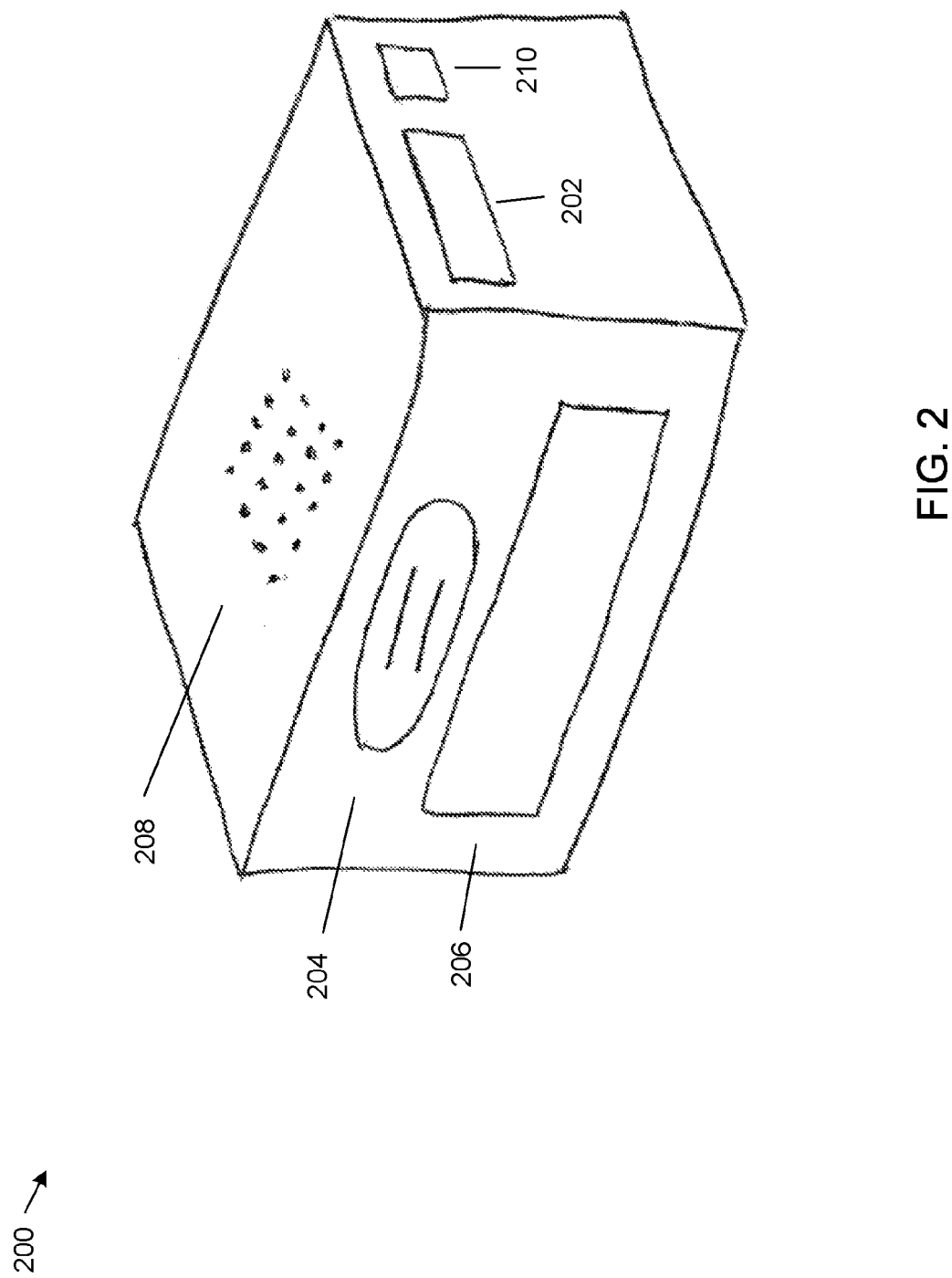
FIG. 2 shows an example illustration of the desktop scent electronic device of FIG. 1.

FIG. 2 shows an example desktop scent electronic device 200. The desktop scent electronic device 200 is an electronic computing device that can be placed on a flat surface such as a desktop. The desktop scent electronic device 200 includes a cartridge 202, a scent output grill 204, a display screen 206, a speaker grill 208 and a Wi-Fi antenna 210. More, fewer or different components are possible.

The example cartridge 202 is an aerosol cartridge that can contain one or more scents. The scents can be released individually or can be combined to form new scents. Production of the scents and the intensity of the scents can be controlled electronically by programming the desktop scent electronic device 102. The cartridge 202 includes an atomizer that can vaporize liquid scent contained within cartridge 202.

In another implementation, the scent particles can be released via natural atomization using a sponge which has been saturated with liquid scent. Scent is released when the sponge is exposed to outside air via an electronic opening of a miniature aperture in the desktop scent electronic device 102. In yet another implementation, heat can be applied to a solid block of scent, resulting in atomization of scent particles. The heat can be triggered electronically.

The example scent output grill 204 receives atomized scent from the cartridge 202 and delivers the scent to the air external to the desktop scent electronic device 102.

The example display screen 206 is an electronic display screen that can provide visual alerts to the user based on trigger conditions. For example, when a trigger condition occurs and a scent is generated, a message can be displayed on the display screen 206 indicating the trigger condition that caused the scent to be released. Other messages and alerts can be displayed on the display screen 206.

The example speaker grill 208 permits audio output from a speaker in the desktop scent electronic device 102. The speaker permits audio messages to be played based on trigger conditions and other conditions.

The example Wi-Fi antenna 210 permits wireless connectivity between the desktop scent electronic device 102 and a home-based Internet router. The router can be hardwired to a connection to network 108. The desktop scent electronic device 102 can also include a hardwired connection to network 108.

The desktop scent electronic device 102 includes one or more microprocessors and other electronic components that can implement the functionality discussed for the desktop scent electronic device 102. The desktop scent electronic device 102 can be powered via a power cable or via batteries.

Figure 3:
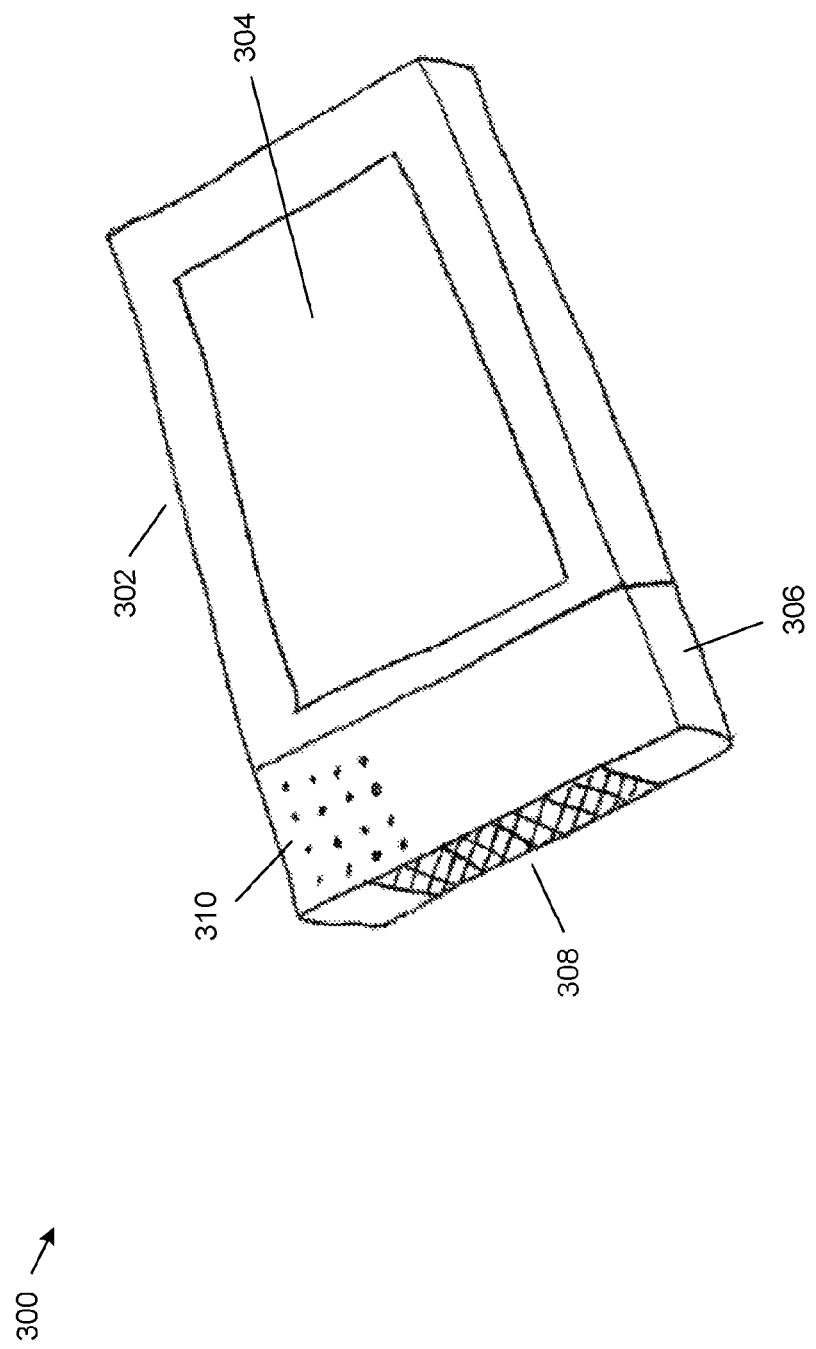
FIG. 3 shows an example illustration of the mobile scent electronic device of FIG. 1.

FIG. 3 shows an example mobile scent electronic device 300. In an implementation shown in FIG. 3, the mobile scent electronic device 300 is comprised of a smartphone 302 and an external scent producing assembly 306. The example smartphone 302 includes a display screen 304. The example external scent producing assembly 306 includes a scent cartridge slot 308 and a scent output grill 310.

The example scent producing assembly 306 can be attached to the smartphone 302 to provide the smartphone 302 with mobile scent releasing capability. The example scent cartridge slot 308 can contain an aerosol cartridge or a plurality of miniature aerosol cartridges. The aerosol cartridge can produce one or more scents under microprocessor control. The miniature aerosol cartridges can each produce a distinct scent under microprocessor control. The produced scents can be emitted from the scent producing assembly 306 via the scent output grill 310. In addition, the scent producing assembly 306 can include an external headset that can direct scent directly into the nose of the user.

Figure 4:
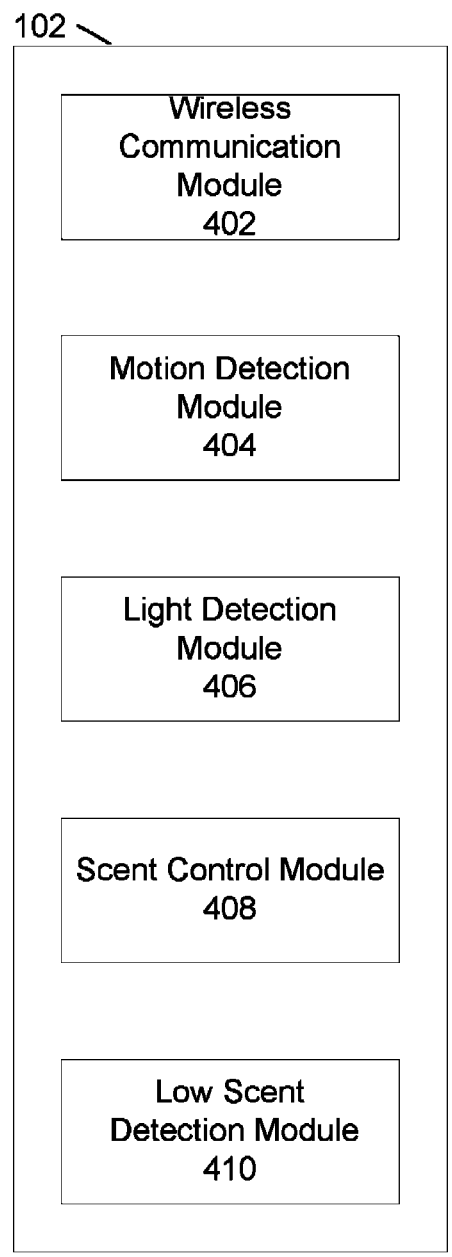
FIG. 4 shows example modules of the desktop scent electronic device of FIG. 1.

FIG. 4 shows example modules of the desktop scent electronic device 102. Some of these modules can also be used in the mobile scent electronic device 104. The example desktop scent electronic device 102 includes a wireless communication module 402, a motion detection module 404, a light detection module 406, a scent control module 408 and a low scent detection module 410.

The example wireless communication module 402 contains a wireless communication interface that provides functionality to permit wireless access between the desktop scent electronic device 102 and network 108. The example Wi-Fi antenna 210 facilitates this functionality. The desktop scent electronic device 102 and the financial institution server computer 110 can communicate through a wireless connection to a home-based Internet router using this functionality. The wireless communication module 402 can also include Bluetooth and NFC (near-field communication) functionality. The Bluetooth and NFC functionality permit short range communications between the desktop scent electronic device 102 and the home-based Internet router.

The example motion detection module 404 contains a motion detector that can detect movement near the desktop scent electronic device 102. When motion is detected, the desktop scent electronic device 102 can emit a scent when a trigger condition occurs.

The example light detection module 406, contains a light detector that can detect ambient light in a vicinity of the desktop scent electronic device 102. When light is detected, and other conditions are met, the desktop scent electronic device 102 can emit a scent when a trigger condition occurs. The other conditions that may be met before scent is emitted can include information regarding a presence of the user, for example whether the user is home or is expected home within a short period of time. The information regarding the presence of the user can be obtained from the motion detector or from information from a user's schedule. The information regarding the user's schedule can be downloaded to the desktop scent electronic device 102 from the financial institution server computer 110. In addition, the light detection module 406 can disable scent emissions when a determination is made that the room in which the desktop scent electronic device is located is dark.

The example scent control module 408 controls the production and emission of scent from the desktop scent electronic device 102. A module similar to scent control module 408 can be used to control the production and emission of scent from the mobile scent electronic device 104. The scent control module 408 receives a trigger condition that originates from the financial institution server computer 110. When the trigger condition occurs, the scent control module 408 determines which scent to emit and an amount of the scent.

In some implementations, information regarding which scent to emit and the amount of the scent to emit can be obtained from the financial institution server computer 110. For example, the financial institution server computer 110 can send a message to the desktop scent electronic device 102. The message can include both an alert that the trigger condition has occurred and information regarding which scent to emit and the amount of the scent to emit. In other implementations, the desktop scent electronic device 102 can include configuration information regarding which scent to emit and the amount of the scent to emit for a plurality of trigger conditions. In these implementations, the scent control module 408 can refer to the configuration information when a trigger condition is received to determine which scent to emit and the amount of the scent to emit.

As stated earlier herein the desktop scent electronic device 102 can emit individual scents or can combine scents to product new scents. A scent that is selected or combined can be produced by atomizing liquid scent contained within an aerosol cartridge used in the desktop scent electronic device. The desktop scent electronic device 102 can control operation of an atomizer within the aerosol cartridge. In addition, as discussed earlier herein, the desktop scent electronic device 102 can include other scent delivery mechanisms, such as a sponge and a solid block of scent. The scent control module 408 can also control the production and emission of scent from these other scent delivery mechanisms.

The example low scent detection module 410 can detect when scent in an aerosol cartridge is below a predetermined limit. When the low scent detection module 410 determines that the scent is below the predetermined limit, for example where less than 10% of scent remains in the aerosol cartridge, the low scent detection module 410 can generate an audible, visual or vibratory alert. The low scent detection module 410 can also determine low scent conditions for other scent delivery mechanisms. For example, the low scent detection module 410 can detect when saturation of a sponge with scent is below a predetermined amount.

Figure 5:
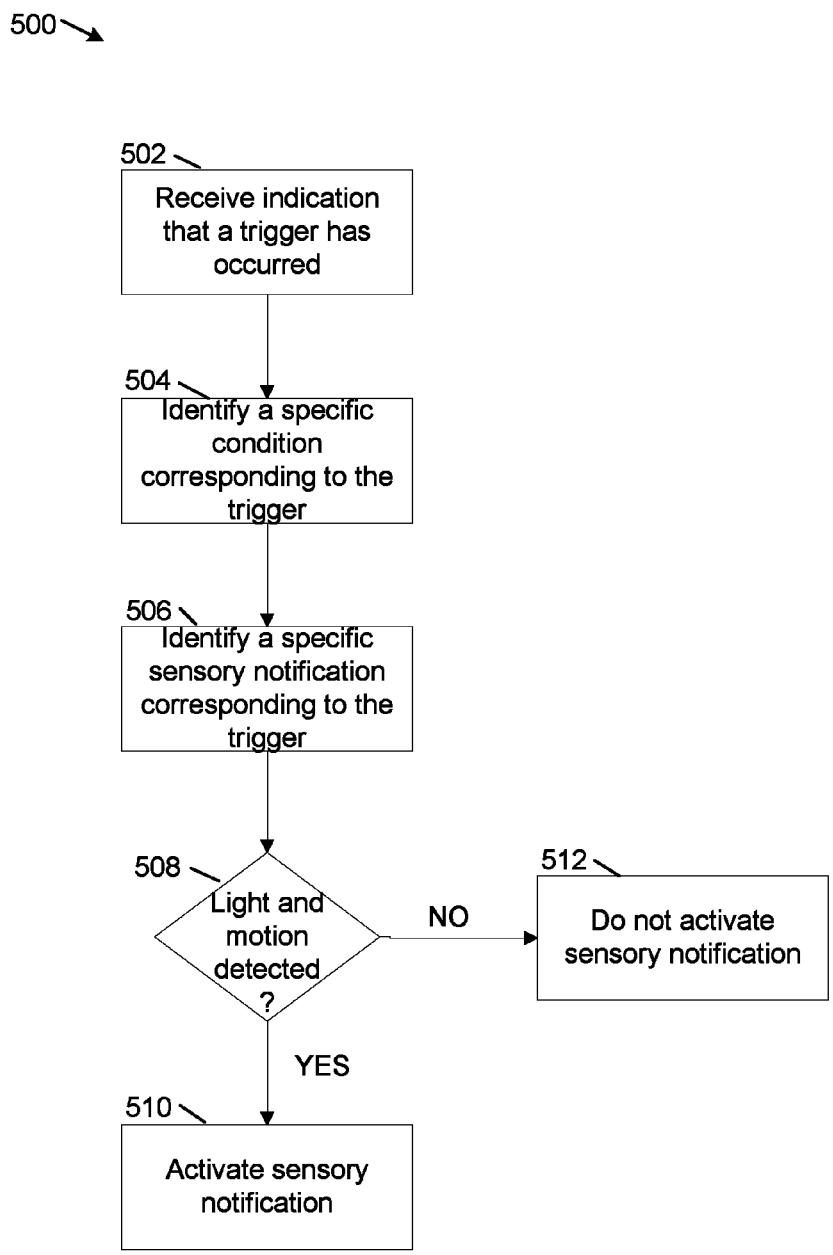
FIG. 5 shows a method for activating a sensory notification based on a trigger condition.

FIG. 5 shows a flowchart of an example method 500 for activating a sensory notification based on a trigger condition. The method 500 assumes that trigger conditions have already been selected and that sensory notifications corresponding to the trigger conditions also have been selected. A discussion of how trigger conditions are set and how sensory notifications are selected is provided later herein, with respect to FIG. 6.

At operation 502, an indication is received that a trigger condition has occurred. The trigger condition can be predetermined triggers for one of a plurality of conditions. As discussed earlier herein, the triggers can be based on financial conditions, time-based conditions, space-based conditions, communications-based conditions, fitness-based conditions and conditions based on an interconnection with other devices. In some implementations, the trigger condition is detected at a server computer, such as financial institution server computer 110, and the indication of the trigger condition is sent from financial institution server computer 110 to desktop scent electronic device 102 or to mobile scent electronic device 104. In other implementations, the trigger condition is detected locally at desktop scent electronic device 102 or at mobile scent electronic device 104.

At operation 504, a specific condition corresponding to the trigger is identified. For example, when the trigger condition is identified at the server computer, the server computer can send a message to desktop scent electronic device 102 or to mobile scent electronic device 104. The message can provide the indication that the trigger condition has occurred and can identify a reason for the trigger condition. For example, one reason for the trigger condition can be that the user has exceeded a monthly budget limit for a specific product category by a predetermined amount or percentage. When the trigger condition is identified at the desktop scent electronic device 102 or the mobile scent electronic device 104, an alert can be activated on the desktop scent electronic device 102 or the mobile scent electronic device 104. The alert can provide an indication of the trigger condition and identify the trigger condition. For example, the alert can include a unique code that identifies the trigger condition.

At operation 506, a specific sensory notification corresponding to the trigger is identified. The sensory notification can be a specific scent pre-selected to be activated when the trigger condition occurs. In addition, a pre-selected audible, visual or tactile notification, for example an audible message, a displayed message or a vibration, can be identified to be activated when the trigger condition occurs. In some implementations only a scent-based notification is activated. In other implementations, a combination of the scent-based notification and one or more of the audible, visual or tactile notification is activated.

At operation 508, a determination is made as to whether light and motion is detected in a vicinity of the device (the desktop scent electronic device 102 or the mobile scent electronic device 104) to which the sensory notification is to be directed. The determination is made to ensure that the sensory notification is activated when the user is in the vicinity of the device, is active and there is either daylight or artificial night in the vicinity of the device. In some implementations, for example for the mobile scent electronic device 104, only motion may need to be detected in order for the sensory notification to be activated.

At operation 508, when the determination is made that light and motion are detected, at operation 510, the sensory notification is activated. At operation 508, when the determination is made that light and motion are not detected, at operation 512, the sensory notification is not activated.

Figure 6:
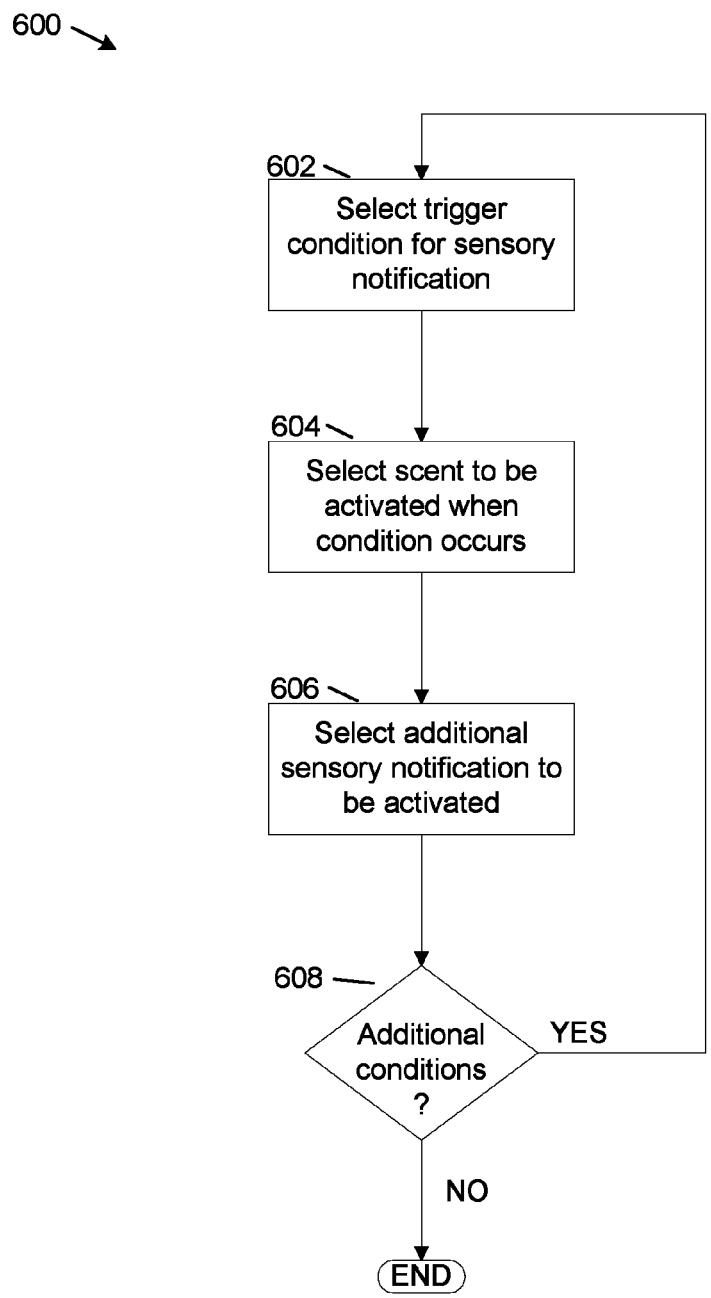
FIG. 6 shows a method for pre-selecting sensory notifications corresponding to identified trigger conditions.

FIG. 6 shows a flowchart of an example method 600 for pre-selecting sensory notifications corresponding to identified trigger conditions.

At operation 602, trigger conditions are selected in which there is to be a sensory notification. The trigger conditions can be selected via a user interface from a software application that can be accessed on user interface device 106. The software application can connect to financial institution server computer 110. Selected trigger conditions can be stored at financial institution server computer 110 or database 112.

The trigger conditions can include a selection of an activating event and parameters associated with the activating event. For example, the user can enter a goal of savings $5,000 within a one-year period for a vacation by making bi-monthly deposits of $200 in a savings account for 11 months and two deposits of $300 into the savings account in a final month of the one-year period. The user can also enter a positive trigger condition associated with this goal. For example, the user can select a positive scent, for example, a scent of roses at bi-monthly intervals when a value of the savings account is equal to or above a pro-rated amount of the goal. A pro-rated amount of the goal can be $200 for a first bi-monthly period, $400 for a second bi-monthly period, etc. The user can also enter a negative trigger condition associated with this goal. For example, the user can select a negative scent, such as vinegar, for when, at a bi-monthly interval, the value of the savings account is less than the pro-rated amount of the goal. The user can also select an intensity of each scent. For example, the intensity of the of roses can be a moderate intensity for the first 11 months of the goal, but when the user is still on track towards the goal in the last month, the intensity can increase to let the user know that the goal is almost reached or is reached.

At operation 604, a scent to be activated when the condition occurs is selected. As discussed above, different scents can be activated for different trigger conditions and an intensity of each scent can be selected to change based on how close or far the user is to the goal and based on a degree to which the user is on track to meeting the goal, as measured in a periodic interval, such as a month.

At operation 606, one or more additional sensory notifications can be selected for each trigger condition. For example, in addition to having a scent-based sensory notification, the user can select one or more or an audible, a visual or a vibratory notification. The user can also enter details for the additional sensory notifications, such as a type and intensity of audible alert, a specific message to display and an intensity and length of time for a vibration.

At operation 608, a determination is made as to whether there are any additional trigger conditions to be selected. When the determination is made that there is at least one additional trigger condition to be selected, control returns to operation 602. However, whether the determination is made that there are not any additional trigger conditions to be selected, method 600 ends.

Figure 7:
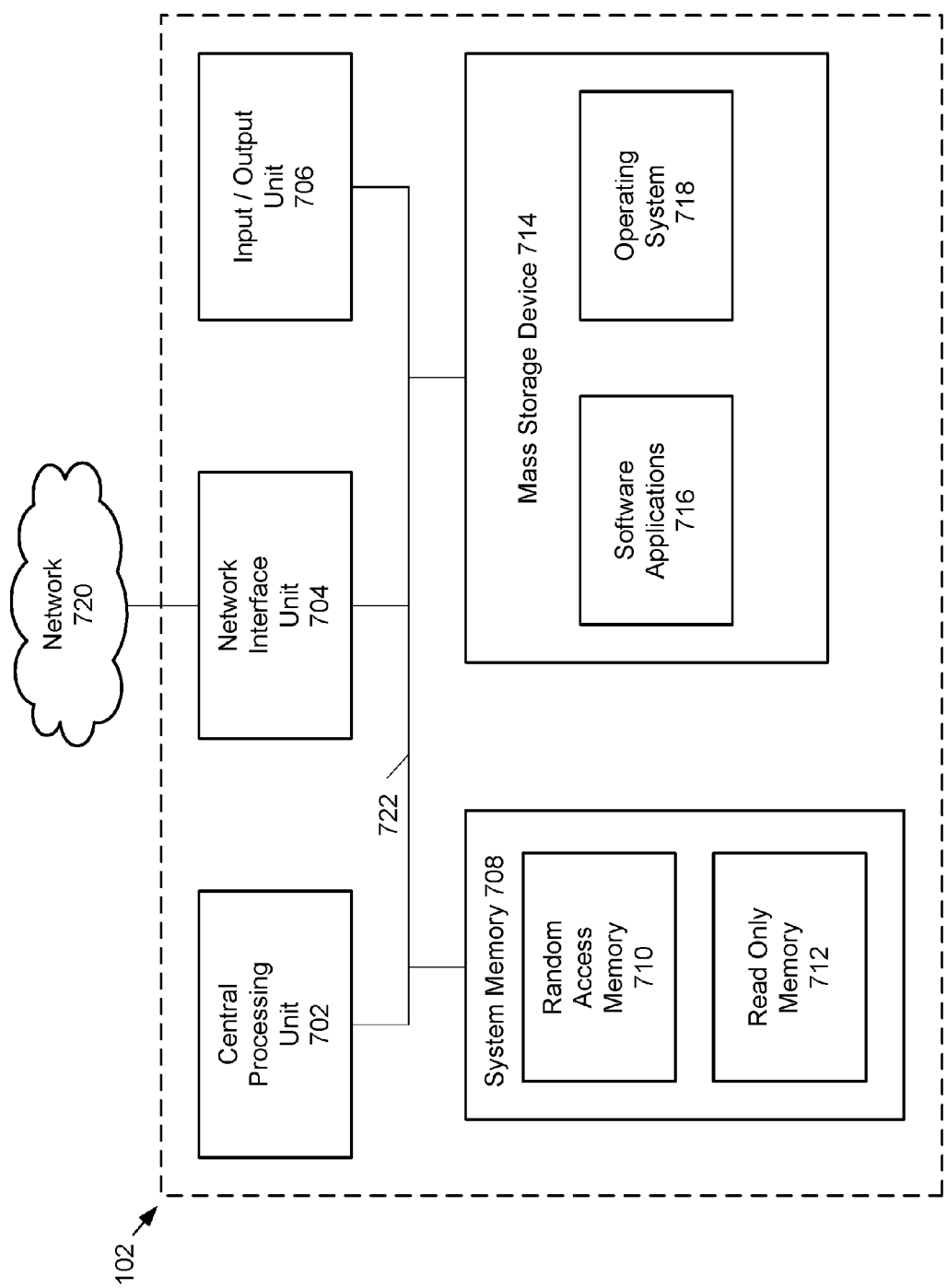
FIG. 7 shows example physical components of the user devices of FIG. 1.

As illustrated in the example of FIG. 7, desktop scent electronic device 102 includes at least one central processing unit ("CPU") 702, a system memory 708, and a system bus 722 that couples the system memory 708 to the CPU 702. The system memory 708 includes a random access memory ("RAM") 710 and a read-only memory ("ROM") 712. A basic input/output system that contains the basic routines that help to transfer information between elements within the desktop scent electronic device 102, such as during startup, is stored in the ROM 712. The desktop scent electronic device 102 further includes a mass storage device 714. The mass storage device 714 is able to store software instructions and data. Some or all of the components of the desktop scent electronic device 102 can also be included in mobile scent electronic device 104 and financial institution server computer 110.

The mass storage device 714 is connected to the CPU 702 through a mass storage controller (not shown) connected to the system bus 722. The mass storage device 714 and its associated computer-readable data storage media provide non-volatile, non-transitory storage for the desktop scent electronic device 102. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the desktop scent electronic device 102.

According to various embodiments of the invention, the desktop scent electronic device 102 may operate in a networked environment using logical connections to remote network devices through the network 720, such as a wireless network, the Internet, or another type of network. The desktop scent electronic device 102 may connect to the network 720 through a network interface unit 704 connected to the system bus 722. It should be appreciated that the network interface unit 704 may also be utilized to connect to other types of networks and remote computing systems. The desktop scent electronic device 102 also includes an input/output controller 706 for receiving and processing input from a number of other devices, including a touch user interface display screen, or another type of input device. Similarly, the input/output controller 706 may provide output to a touch user interface display screen or other type of output device.

As mentioned briefly above, the mass storage device 714 and the RAM 710 of the desktop scent electronic device 102 can store software instructions and data. The software instructions include an operating system 718 suitable for controlling the operation of the desktop scent electronic device 102. The mass storage device 714 and/or the RAM 710 also store software instructions, that when executed by the CPU 702, cause the desktop scent electronic device 102 to provide the functionality of the desktop scent electronic device 102 discussed in this document. For example, the mass storage device 714 and/or the RAM 710 can store software instructions that, when executed by the CPU 702, cause the desktop scent electronic device 102 to display received data on the display screen of the desktop scent electronic device 102.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method implemented on an electronic computing device for generating a sensory notification for a user of the electronic computing device, the method comprising:
   receiving at the electronic computing device a first indication that a first trigger for a first alert has occurred, the first trigger related to an occurrence of a first trigger condition related to a financial health of a user;
   identify a first scent that is mapped to the occurrence of the first trigger condition, the first scent being one of a plurality of scents available on the electronic computing device, each of the plurality of scents being mapped to one of a plurality of trigger conditions;
   determining whether the user is near the electronic computing device;
   when the first indication is received that the first trigger for the first alert has occurred and when a determination is made that the user is near the electronic computing device, activating the first scent on the electronic computing device, the activating of the first scent on the electronic computing device causing the first scent to emanate from the electronic computing device;
   receive on the electronic computing device a second indication that a second trigger condition for a second alert has occurred, the second trigger condition being different than the first trigger condition, the second trigger condition being mapped to a second scent that is different than the first scent, the second scent being one of the plurality of scents available on the electronic computing device; and
   when the second indication is received that the second trigger for the second alert has occurred and when a determination is made that the user is near the electronic computing device, activating the second scent on the electronic computing device, the activating of the second scent on the electronic computing device causing the second scent to emanate from the electronic computing device.

2. The method of claim 1, wherein each of the plurality of trigger conditions is mapped to a corresponding scent.

3. The method of claim 1, wherein the sensory notification comprises a pleasant scent when the first trigger condition or the second trigger condition corresponds to positive progress towards a goal and an unpleasant scent when the first trigger condition or the second trigger condition corresponds to negative progress away from the goal.

4. The method of claim 3, wherein an intensity of the pleasant scent is based on an amount of positive progress towards the goal and an intensity of the unpleasant scent is based on an amount of negative progress away from the goal.

5. The method of claim 1, wherein the first trigger and the second trigger are generated on a server computer and sent to the electronic computing device.

6. The method of claim 1, wherein the first trigger and the second trigger are generated on the electronic computing device based on an occurrence of a trigger condition that is detected on the electronic computing device.

7. The method of claim 1, wherein the first trigger and the second trigger are activated at a specified geographical location of the user.

8. The method of claim 1, wherein determining whether the user is near the electronic computing device further comprises determining whether motion and light can be detected near the electronic computing device, and not causing a scent to emanate from the electronic computing device unless a determination is made that motion and light can be detected near the electronic computing device.

9. The method of claim 1, further comprising:
   determining by the electronic computing device when a quantity of scent remaining in a scent delivery mechanism is below a predetermined threshold; and
   when a determination is made that the quantity of scent remaining in the scent delivery mechanism is below the predetermined threshold, generating a third alert that the quantity of scent is low.

10. An electronic computing device configured to generate a sensory notification for a user of the electronic computing device comprising:
    a processing unit;
    and
    a scent producing component,
    wherein the processing unit is configured to:
       receive at the electronic computing device a first indication that a first trigger for a first alert has occurred, the first trigger related to an occurrence of a first trigger condition, the first trigger condition related to a financial health of the user;
       identify a first scent that is mapped to the occurrence of the first trigger condition, the first scent being one of a plurality of scents available on the scent producing component, each of the plurality of scents being mapped to one of a plurality of trigger conditions;

determine whether motion and light can be detected near the electronic computing device;

when the first indication is received that the first trigger for the first alert has occurred and when a determination is made that motion and light are detected near the electronic computing device, activate the first scent on the scent producing component, the activating of the first scent causing the first scent to emanate from the electronic computing device;

receive on the electronic computing device a second indication that a second trigger for a second alert has occurred, the second trigger being related to an occurrence of a second trigger condition, the second trigger condition being different than the first trigger condition, the second trigger being mapped to a second scent that is different than the first scent, the second scent being one of the plurality of scents available on the scent producing component; and when the second indication is received that the second trigger condition for the second alert has occurred and when a determination is made that motion and light are detected near the electronic computing device, activate the second scent on the scent producing component, the activating of the second scent causing the second scent to emanate from the electronic computing device.

11. The electronic computing device of claim 10, wherein the electronic computing device comprises a mobile electronic device that includes the scent producing component.

12. The electronic computing device of claim 11, wherein the scent producing component is included in a housing attached to the mobile electronic device.

13. The electronic computing device of claim 10, wherein the scent producing component can produce a plurality of scents.

14. The electronic computing device of claim 13, wherein the scent producing component can combine scents to produce a distinct scent different from any of the plurality of scents.

15. The electronic computing device of claim 13, wherein the scent producing component produces a pleasant scent when the first trigger condition or the second trigger condition corresponds to positive progress towards a goal and an unpleasant scent when the first trigger condition or the second trigger condition corresponds to negative progress away from the goal.

16. The electronic computing device of claim 10, wherein the electronic computing device receives the first trigger condition and the second trigger condition via a wireless communication interface.

17. The electronic computing device of claim 10, wherein the scent producing component comprises an aerosol cartridge.

18. The electronic computing device of claim 10, wherein the scent producing component comprises a sponge that has been saturated with liquid scent.

19. A non-transitory computer-readable data storage memory comprising instructions that, when executed by a processing unit of an electronic computing device, cause the processing unit to:

receive at the electronic computing device a first indication that a first trigger for a first alert has occurred, the first trigger related to an occurrence of a first trigger condition, the first trigger condition related to a financial health of a user;

identify a first scent that is mapped to the occurrence of the first trigger condition, the first scent being one of a plurality of scents available on the electronic computing device, each of the one of the plurality of scents being mapped to one of a plurality of trigger conditions;

determine whether motion and light can be detected near the electronic computing device;

when the first indication is received that the first trigger for the first alert has occurred and when a determination is made that motion and light are detected near the electronic computing device, activate the first scent on the electronic computing device, the activating of the first scent causing the first scent to emanate from the electronic computing device;

receive on the electronic computing device a second indication that a second trigger for a second alert has occurred, the second trigger related to an occurrence of a second trigger condition, the second trigger condition being different than the first trigger condition, the second trigger being mapped to a second scent that is different than the first scent, the second scent being one of the plurality of scents available on the electronic computing device; and when the second indication is received that the second trigger for the second alert has occurred and when a determination is made that motion and light are detected near the electronic computing device, activate the second scent on the electronic computing device, the activating of the second scent causing the second scent to emanate from the electronic computing device.

* * * * *